(12) United States Patent
Koh et al.

(10) Patent No.: US 10,326,963 B2
(45) Date of Patent: Jun. 18, 2019

(54) DISPLAY DEVICE WITH GRADUALLY CHANGING DRIVING FREQUENCY AND METHOD FOR DRIVING THE SAME

(71) Applicant: SAMSUNG DISPLAY CO., LTD., Yongin-si, Gyeonggi-do (KR)

(72) Inventors: Jaihyun Koh, Yongin-si (KR); Jaehoon Lee, Seoul (KR); Jeongbong Lee, Hwaseong-si (KR)

(73) Assignee: SAMSUNG DISPLAY CO. LTD., Gyeonggi-Do (KR)

( * ) Notice: Subject to any disclaimer, the term of this patent is extended or adjusted under 35 U.S.C. 154(b) by 0 days.

(21) Appl. No.: 15/674,844

(22) Filed: Aug. 11, 2017

(65) Prior Publication Data

US 2018/0048853 A1 Feb. 15, 2018

(30) Foreign Application Priority Data

Aug. 11, 2016 (KR) .......................... 10-2016-0102397

(51) Int. Cl.
*H04N 7/01* (2006.01)
*G09G 3/36* (2006.01)
*G09G 3/20* (2006.01)

(52) U.S. Cl.
CPC ......... *H04N 7/0132* (2013.01); *G09G 3/2092* (2013.01); *G09G 3/3614* (2013.01);
(Continued)

(58) Field of Classification Search
CPC .. H04N 7/0132; G09G 3/2092; G09G 3/3688; G09G 3/3614; G09G 2310/08;
(Continued)

(56) References Cited

U.S. PATENT DOCUMENTS

2011/0216240 A1\* 9/2011 Ohno .................. H04N 7/01
348/441
2013/0038621 A1\* 2/2013 Choi ................... G09G 3/2092
345/589
(Continued)

FOREIGN PATENT DOCUMENTS

JP 09090906 A 4/1997
KR 1020100068625 A 6/2010
(Continued)

*Primary Examiner* — Temesghen Ghebretinsae
*Assistant Examiner* — Ivelisse Martinez Quiles
(74) *Attorney, Agent, or Firm* — Cantor Colburn LLP

(57) ABSTRACT

A display device includes: a display panel; and a frequency controller which receives an image data signal and an input frequency information and outputs the image data signal and a timing control signal. The frequency controller includes: an image processor which receives the image data signal; a frame memory which stores the image data signal; an output frequency determining unit which receives the input frequency information and determines an output frequency based on a variation amount of the input frequency; and an image output unit which receives the image data signal from the image processor, receives an output frequency information from the output frequency determining unit, and outputs the image data signal and the timing control signal. When an input frequency varies, the output frequency determining unit determines the output frequency based on the following equations:

$$K = \left|\frac{FREQ - P\_FREQ}{M\_FREQ}\right| \times SLOPE + OFFSET, \text{ and}$$

$$FREQ' = FREQ \times K + P\_FREQ \times (1 - K).$$

13 Claims, 7 Drawing Sheets

(52) U.S. Cl.
CPC ......... *G09G 3/3648* (2013.01); *G09G 3/3688* (2013.01); *G09G 3/3696* (2013.01); *G09G 2310/027* (2013.01); *G09G 2310/08* (2013.01); *G09G 2320/0247* (2013.01); *G09G 2340/0435* (2013.01); *G09G 2360/18* (2013.01)

(58) Field of Classification Search
CPC ........... G09G 2310/027; G09G 3/3696; G09G 3/3648; G09G 2340/0435; G09G 2320/0247; G09G 2360/18
See application file for complete search history.

(56) References Cited

U.S. PATENT DOCUMENTS

2015/0145900 A1   5/2015  Lee et al.
2017/0148390 A1*  5/2017  Park ..................... G09G 3/3225

FOREIGN PATENT DOCUMENTS

| KR | 1020150059385 A | 6/2015 |
| KR | 1020150078354 A | 7/2015 |

* cited by examiner

DISPLAY DEVICE WITH GRADUALLY CHANGING DRIVING FREQUENCY AND METHOD FOR DRIVING THE SAME

This application claims priority to Korean Patent Application No. 10-2016-0102397, filed on Aug. 11, 2016, and all the benefits accruing therefrom under 35 U.S.C. § 119, the content of which in its entirety is herein incorporated by reference.

FIELD

Embodiments of the invention relate to a display device and a method of driving the display device, and more particularly, to a display device for substantially preventing flickering generated in a display device driven at a fluctuating frequency and a method of driving the display device.

DISCUSSION OF RELATED ART

Display devices may be classified as a liquid crystal display ("LCD") device, an organic light emitting diode ("OLED") display device, a plasma display panel ("PDP") device, an electrophoretic display device and the like based on a light emitting scheme thereof.

Such a display device may be driven at different frequencies according to an image data signal. When driven at different frequencies, a charging rate of a pixel electrode varies depending on the frequency. Accordingly, a luminance difference occurs at a point in time when the frequency changes and the flickering may be visually recognized.

SUMMARY

Embodiments of the invention are directed to a display device in which flickering that may occur due to a driving frequency change is effectively prevented and a method of driving the display device.

According to an exemplary embodiment, a display device includes: a display panel; and a frequency controller which receives an image data signal and an input frequency information and outputs the image data signal and a timing control signal. In such an embodiment, the frequency controller includes: an image processor which receives the image data signal; a frame memory which stores the image data signal; an output frequency determining unit which receives the input frequency information and determines an output frequency based on the input frequency information; and an image output unit which receives the image data signal from the image processor, receives an output frequency information on the output frequency from the output frequency determining unit, and outputs the image data signal and the timing control signal based on the output frequency information. In such an embodiment, when an input frequency varies, the output frequency determining unit determines the output frequency based on a variation amount of the input frequency according to Equation 1 and Equation 2. In such an embodiment, Equation 1 is the following equation:

$$K = \left| \frac{FREQ - P\_FREQ}{M\_FREQ} \right| \times SLOPE + OFFSET,$$

Equation 2 is the following equation: $FREQ'=FREQ \times K + P\_FREQ \times (1-K)$, where K denotes a weight, FREQ denotes the input frequency, FREQ' denotes the output frequency, P_FREQ denotes a previous output frequency, which is previously stored in the output frequency determining unit, M_FREQ denotes the maximum frequency of driving frequencies of the display panel, SLOPE denotes a first variation rate constant, and OFFSET denotes a second variation rate constant.

In an exemplary embodiment, each of SLOPE and OFFSET in Equation 1 may be greater than zero (0) and less than 1.

In an exemplary embodiment, SLOPE in Equation 1 may be 0.4 or greater and 0.6 or less, and OFFSET in Equation 1 may be 0.1 or greater and 0.3 or less.

In an exemplary embodiment, M_FREQ in Equation 1 may be 144 hertz (Hz).

In an exemplary embodiment, the output frequency determining unit may further include a frequency storing unit.

In an exemplary embodiment, the display device may further include a timing controller including the frequency controller.

In an exemplary embodiment, the display device may further include a scaler including the frequency controller.

In an exemplary embodiment, when the input frequency varies, the output frequency information may gradually approach the input frequency information.

In an exemplary embodiment, the image output unit may calculate a period of the image data signal based on the following Equation 3:

$$T = \frac{1}{FREQ'},$$

where T denotes the period.

According to another exemplary embodiment, a method of driving a display device includes: obtaining an input frequency information; determining whether an image data signal is input; storing the image data signal; identifying a previous frequency information; calculating and determining an output frequency; calculating a period based on the output frequency and delaying an output of the image data signal by the period; and outputting the image data signal. In such an embodiment, the calculating and determining the output frequency include calculating the output frequency according to Equation 1 and Equation 2. In such an embodiment, Equation 1 is the following equation:

$$K = \left| \frac{FREQ - P\_FREQ}{M\_FREQ} \right| \times SLOPE + OFFSET,$$

Equation 2 is the following equation: $FREQ'=FREQ \times K + P\_FREQ \times (1-K)$, where K denotes a weight, FREQ denotes the input frequency, FREQ' denotes the output frequency, P_FREQ denotes a previous output frequency, which is previously stored in the output frequency determining unit, M_FREQ denotes the maximum frequency of driving frequencies of the display panel, SLOPE denotes a first variation rate constant, and OFFSET denotes a second variation rate constant.

In an exemplary embodiment, the calculating the period and the delaying the output of the image data signal by the period may include calculating the period according to Equation 3; outputting a timing control signal for delaying the output of the image data signal by the period; and delaying the output of the image data signal based on the timing control signal. In such an embodiment, Equation 3 is the following equation:

$$T = \frac{1}{FREQ},$$

where T denotes the period.

In an exemplary embodiment, the storing the image data signal may include: storing the image data signal when it is determined that the image data signal is input, and not storing the image data signal when it is determined that the image data signal is not input.

In an exemplary embodiment, the outputting the image data signal may include: outputting a stored image data signal when it is determined that the image data signal is not input.

The foregoing is illustrative only and is not intended to be in any way limiting. In addition to the illustrative aspects, exemplary embodiments and features described above, further aspects, exemplary embodiments and features will become apparent by reference to the drawings and the following detailed description.

BRIEF DESCRIPTION OF THE DRAWINGS

A more complete appreciation of the invention will become more apparent by describing in detail exemplary embodiments thereof with reference to the accompanying drawings, in which.

DETAILED DESCRIPTION

Figure 1:
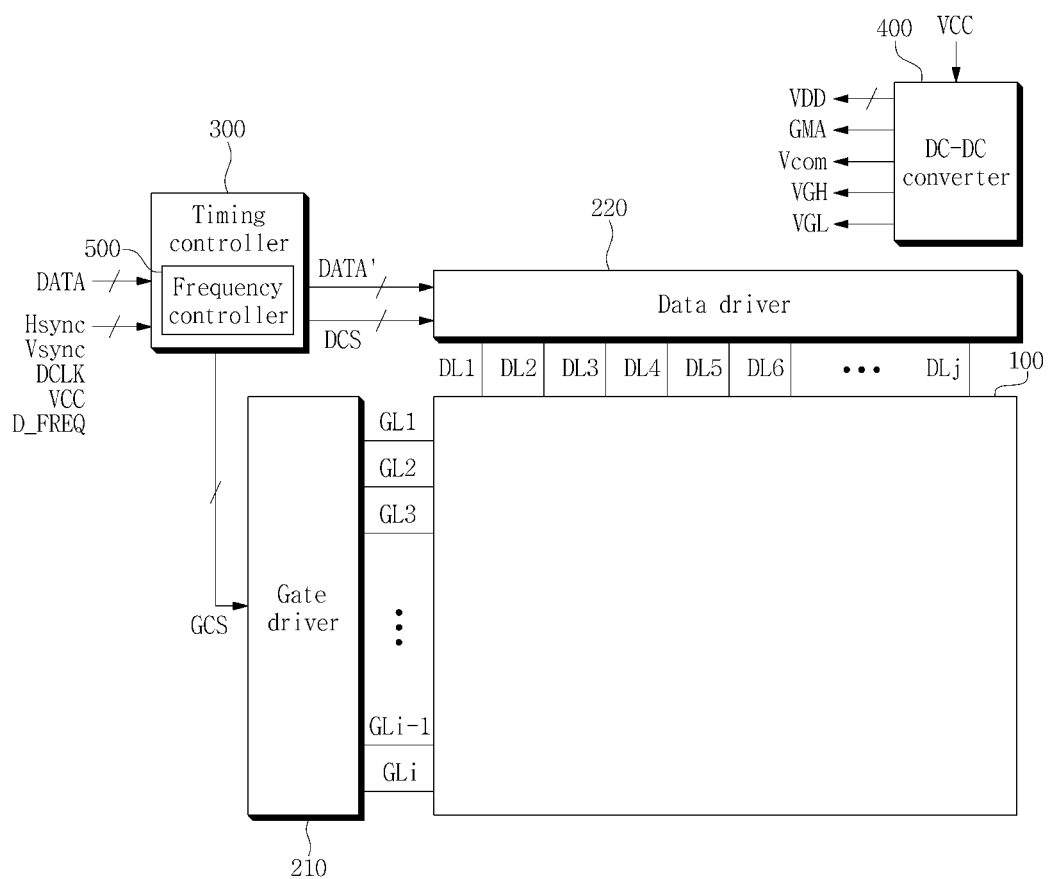
FIG. 1 is a block diagram illustrating a display device according to an exemplary embodiment.

Exemplary embodiments will now be described more fully hereinafter with reference to the accompanying drawings. Although the invention may be modified in various manners and have several exemplary embodiments, exemplary embodiments are illustrated in the accompanying drawings and will be mainly described in the specification. However, the scope of the invention is not limited to the exemplary embodiments and should be construed as including all the changes, equivalents and substitutions included in the spirit and scope of the invention.

In the drawings, thicknesses of a plurality of layers and areas are illustrated in an enlarged manner for clarity and ease of description thereof. When a layer, area, or plate is referred to as being "on" another layer, area, or plate, it may be directly on the other layer, area, or plate, or intervening layers, areas, or plates may be therebetween. Conversely, when a layer, area, or plate is referred to as being "directly on" another layer, area, or plate, intervening layers, areas, or plates may be absent therebetween. Further when a layer, area, or plate is referred to as being "below" another layer, area, or plate, it may be directly below the other layer, area, or plate, or intervening layers, areas, or plates may be therebetween. Conversely, when a layer, area, or plate is referred to as being "directly below" another layer, area, or plate, intervening layers, areas, or plates may be absent therebetween.

The spatially relative terms "below", "beneath", "less", "above", "upper" and the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device illustrated in the drawing is turned over, the device positioned "below" or "beneath" another device may be placed "above" another device. Accordingly, the illustrative term "below" may include both the lower and upper positions. The device may also be oriented in the other direction and thus the spatially relative terms may be interpreted differently depending on the orientations.

Throughout the specification, when an element is referred to as being "connected" to another element, the element is "directly connected" to the other element, or "electrically connected" to the other element with one or more intervening elements interposed therebetween. It will be further understood that the terms "comprises," "including," "includes" and/or "including," when used in this specification, specify the presence of stated features, integers, steps, operations, elements and/or components, but do not preclude the presence or addition of one or more other features, integers, steps, operations, elements, components and/or groups thereof.

It will be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" may be termed likewise without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the specification.

Some of the parts which are not associated with the description may not be provided in order to specifically describe embodiments of the invention and like reference numerals refer to like elements throughout the specification.

Hereinafter, exemplary embodiments of a display device will be described with reference to FIGS. 1, 2A, 2B, 3 and 4.

Figure 2A:
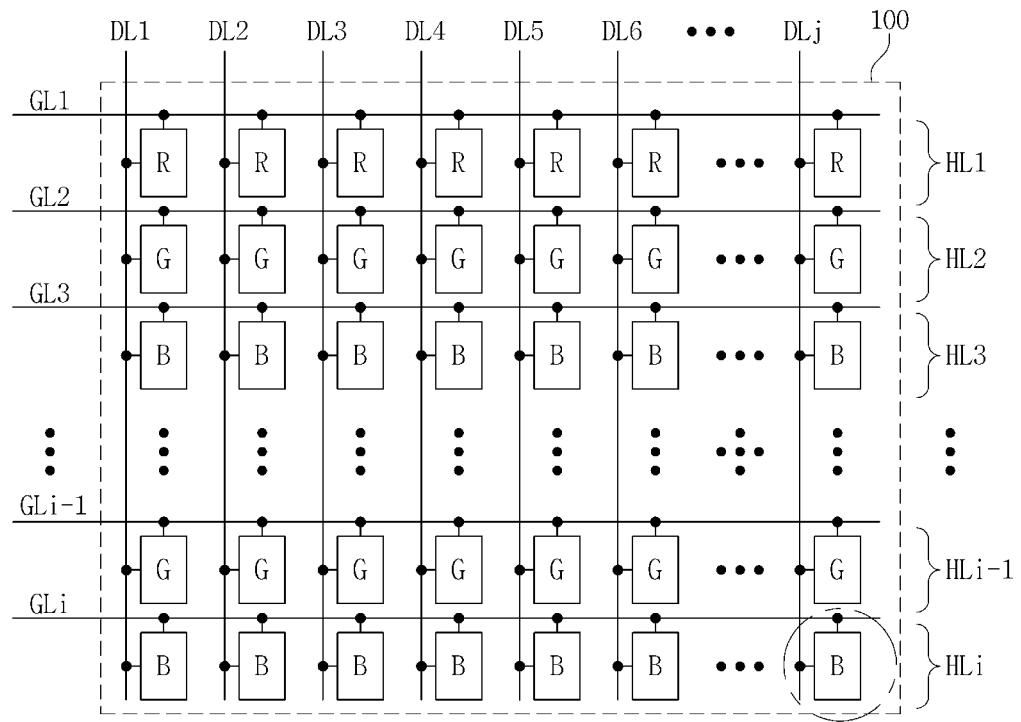
FIG. 2A is a block diagram illustrating a display panel illustrated in FIG. 1.
Figure 2B:
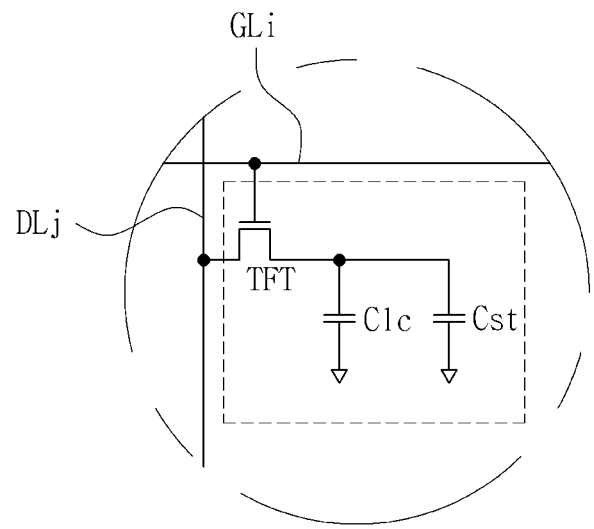
FIG. 2B is an enlarged view of the encircled portion of FIG. 2A.
Figure 3:
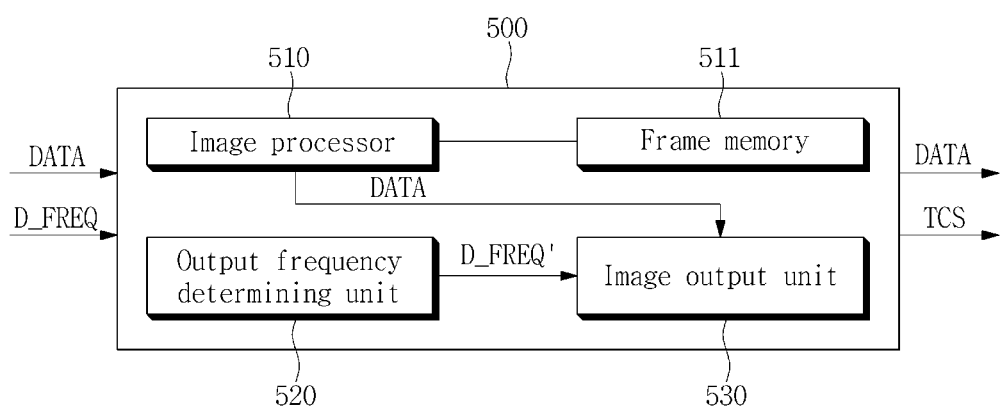
FIG. 3 is a block diagram illustrating a frequency controller according to an exemplary embodiment.
Figure 4:
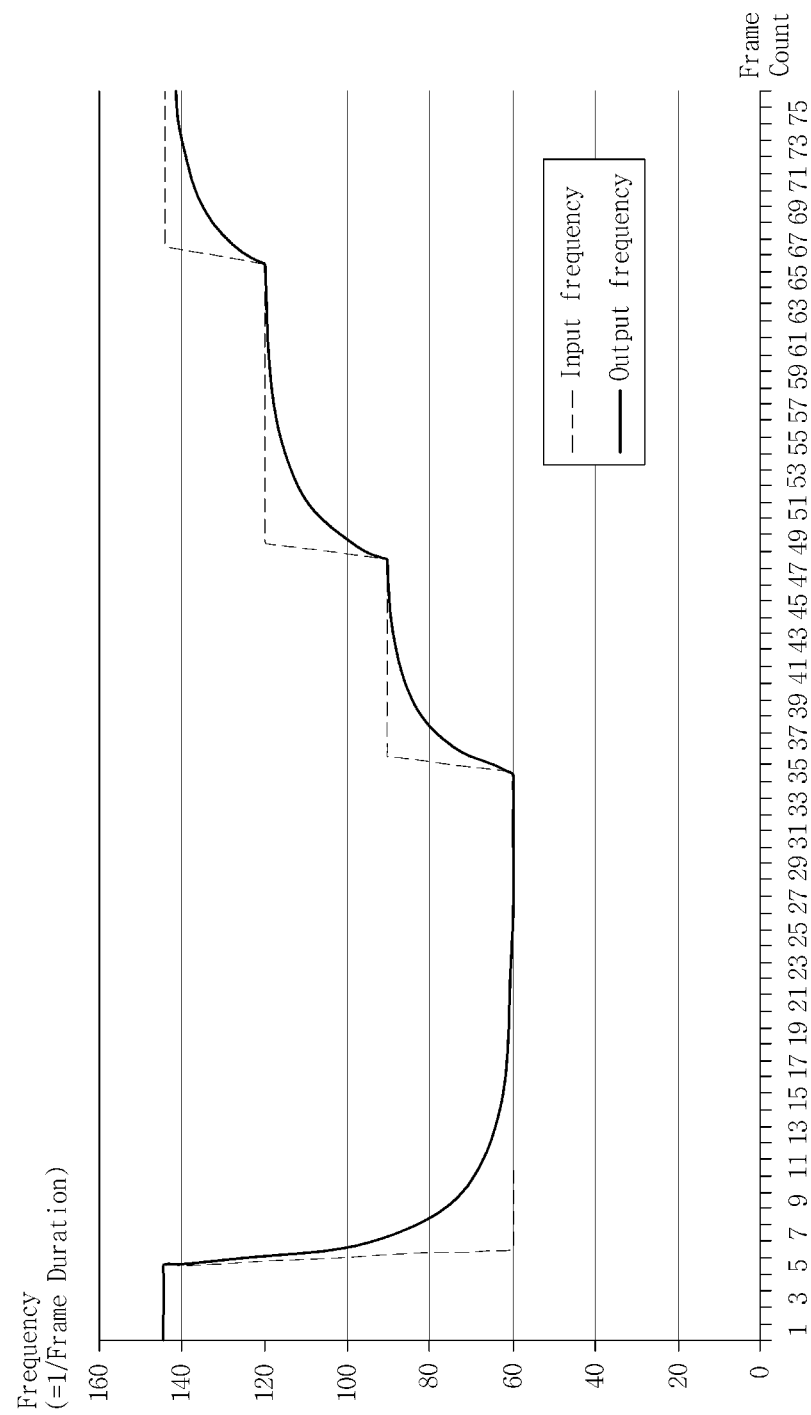
FIG. 4 is a view illustrating a simulation result of a frequency determination algorithm according to an exemplary embodiment.

FIG. 1 is a block diagram illustrating a display device according to an exemplary embodiment, FIG. 2A is a block diagram illustrating a display panel illustrated in FIG. 1, FIG. 2B is an enlarged view of the encircled portion of FIG. 2A, FIG. 3 is a block diagram illustrating a frequency controller according to an exemplary embodiment, and FIG. 4 is a view illustrating a simulation result of a frequency determination algorithm according to an exemplary embodiment.

In an exemplary embodiment, as illustrated in FIG. 1, the display device includes a display panel 100, a timing controller 300, a gate driver 210, a data driver 220 and a direct current-to-direct current ("DC-DC") converter 400.

The display panel 100 displays an image. In an exemplary embodiment, the display panel 100 may be a liquid crystal display ("LCD") panel. In such an embodiment, the display panel 100 includes a liquid crystal layer (not illustrated), a first substrate (not illustrated) and a second substrate (not illustrated) facing the first substrate with the liquid crystal layer interposed therebetween. For convenience of description, exemplary embodiments where the display panel 100 is an LCD panel will hereinafter be described in detail, but exemplary embodiments are not limited thereto. In an alternative exemplary embodiment, the display panel may be an OLED display panel, a plasma display panel or an electrophoretic display panel.

In an exemplary embodiment, as illustrated in FIG. 2A, the display panel 100 includes a plurality of gate lines GL1 to GLi, a plurality of data lines DL1 to DLj and a plurality of pixels R, G and B.

The gate lines GL1 to GLi intersect the data lines DL1 to DLj.

The pixels R, G and B are arranged along horizontal lines HL1 to HLi. The pixels R, G and B are connected to the gate lines GL1 to GLi and the data lines DL1 to DLj. In one exemplary embodiment, for example, there are j pixels arranged along an n-th (n being one selected from 1 to i) horizontal line (hereinafter, n-th horizontal line pixels), which are connected to the first to j-th data lines DL1 to DLj, respectively. Herein, j is a natural number. In such an embodiment, the n-th horizontal line pixels are connected in common to the n-th gate line. Accordingly, the n-th horizontal line pixels receive an n-th gate signal as a common signal. In such an embodiment, the j pixels disposed in a same horizontal line receive a same gate signal, while pixels disposed in different horizontal lines receive different gate signals, respectively. In one exemplary embodiment, for example, pixels in a first horizontal line HL1 receive a first gate signal as a common signal, while pixels in a second horizontal line HL2 receive a second gate signal that has a different timing from that of the first gate signal.

In an exemplary embodiment, as illustrated in FIG. 2B, each of the pixels R, G and B includes a thin film transistor ("TFT"), a liquid crystal capacitor Clc and a storage capacitor Cst.

The TFT is turned on in response to a gate signal applied from the gate line GLi. The turned-on TFT applies an analog data signal applied from the data line DL1 to the liquid crystal capacitor Clc and the storage capacitor Cst.

The liquid crystal capacitor Clc includes a pixel electrode (not illustrated) and a common electrode (not illustrated) which oppose each other.

The storage capacitor Cst includes a pixel electrode (not illustrated) and an opposing electrode (not illustrated) which oppose each other. Herein, the opposing electrode may be a previous gate line GLi−1 or a transmission line for transmitting a common voltage.

The timing controller 300 receives a vertical synchronization signal Vsync, a horizontal synchronization signal Hsync, an image data signal DATA, a clock signal DCLK and an input frequency information D_FREQ output from a graphic controller provided in a system. Herein, the input frequency information D_FREQ is information on driving frequency corresponding to the image data signal DATA. An interface circuit (not illustrated) is provided or connected between the timing controller 300 and the system and the above signals output from the system are input to the timing controller 300 through the interface circuit. The interface circuit may be embedded in the timing controller 300.

Although not illustrated, the interface circuit includes a low voltage differential signaling ("LVDS") receiver. The interface circuit lowers the voltage levels of the vertical synchronization signal Vsync, the horizontal synchronization signal Hsync, the image data signal DATA and the clock signal DCLK output from the system, while raising the frequencies thereof.

In an exemplary embodiment, electromagnetic interference ("EMI") may occur due to high frequency components of a signal input from the interface circuit to the timing controller 300. In an exemplary embodiment, an EMI filter (not illustrated) may be further provided or connected between the interface circuit and the timing controller 300 to prevent the EMI.

The timing controller 300 generates a gate control signal GCS for controlling the gate driver 210 and a data control signal DCS for controlling the data driver 220, based on the vertical synchronization signal Vsync, the horizontal synchronization signal Hsync and the clock signal DCLK. The gate control signal GCS includes a gate start pulse, a gate shift clock, a gate output enable signal and the like. The data control signal DCS includes a source start pulse, a source shift clock, a source output enable signal, a polarity signal and the like.

In such an embodiment, the timing controller 300 rearranges the image data signals DATA input through the system and applies the rearranged image data signals DATA' to the data driver 220.

In an exemplary embodiment, the timing controller 300 is driven by a driving power VCC output from a power unit provided in the system. In one exemplary embodiment, for example, the driving power VCC is used as a power voltage of a phase lock loop ("PLL") circuit embedded in the timing controller 300. The PLL circuit compares the clock signal DCLK input to the timing controller 300 with a reference frequency generated from an oscillator. Then, when it is determined that there is a difference between the clock signal DCLK and the reference frequency, the PPL circuit adjusts the frequency of the clock signal DCLK by the difference to generate a sampling clock signal. The sampling clock signal is a signal for sampling the rearranged image data signals DATA'.

According to an exemplary embodiment, the timing controller 300 includes a frequency controller 500.

The frequency controller 500 receives the image data signal DATA and the input frequency information D_FREQ at a maximum frequency of a driving frequency of the display device.

In an exemplary embodiment, as illustrated in FIG. 3, the frequency controller 500 includes an image processor 510, a frame memory 511, an output frequency determining unit 520 and an image output unit 530.

The image processor 510 may receive the image data signal DATA at the maximum frequency of the driving frequency of the display device. In one exemplary embodiment, for example, the maximum frequency of the driving frequency of the display device may be about 144 hertz (Hz). The maximum frequency of the driving frequency of the display device may be determined based on the configuration of the display device.

The image processor 510 stores the received image data signal DATA in the frame memory 511. The image processor 510 outputs the stored image data signal DATA.

In an exemplary embodiment, as described above, the frame memory 511 stores the image data signal DATA output from the image processor 510.

The output frequency determining unit 520 receives the input frequency information D_FREQ, which is information or data on the input frequency. When the input frequency varies, the output frequency determining unit 520 determines an output frequency based on a variation amount of the input frequency to output an output frequency information D_FREQ', which is information or data on the output frequency.

Although not illustrated, the output frequency determining unit 520 may further include a previous frequency storing unit for storing previous frequency information.

The output frequency determining unit 520 calculates a weight K, which is a variable for calculating the output frequency, using the input frequency and the previous frequency. The output frequency determining unit 520 may calculate the weight K using the following Equation 1.

$$K = \left| \frac{FREQ - P\_FREQ}{M\_FREQ} \right| \times SLOPE + OFFSET \quad \text{[Equation 1]}$$

In Equation 1, FREQ and P_FREQ denote the input frequency and a previous output frequency, respectively. In Equation 1, SLOPE and OFFSET respectively denote first and second variation rate constants, which are constants for controlling a rate of frequency change, and each of SLOPE and OFFSET may be larger than 0 and less than 1. In one exemplary embodiment, for example, SLOPE may be 0.5 and OFFSET may be 0.2. In Equation 1, M_FREQ denotes the maximum frequency of the driving frequency of the display device. In one exemplary embodiment, for example, M_FREQ may be 144 Hz. In such an embodiment, the maximum frequency is predetermined based on the configuration or specification of the display device.

The output frequency determining unit 520 calculates the output frequency using the weight K calculated according to Equation 1. The output frequency determining unit 520 may obtain the output frequency using the following Equation 2.

$$FREQ' = FREQ \times K + P\_FREQ \times (1-K) \quad \text{[Equation 2]}$$

In Equation 2, FREQ and P_FREQ denote the input frequency and the previous output frequency, respectively, and FREQ' denotes the output frequency.

The output frequency determining unit 520 determines the output frequency using a frequency determination algorithm based on Equation 1 and Equation 2.

The image output unit 530 receives the rearranged image data signal DATA' stored in the frame memory 511 from the image processor 510 and receives the output frequency information D_FREQ' from the output frequency determining unit 520. The image output unit 530 calculates a period (T) of the image data signal DATA using the output frequency. The image output unit 530 may calculate the period (T) using the following Equation 3.

$$T = \frac{1}{FREQ'} \quad \text{[Equation 3]}$$

In Equation 3, T denotes the period, and FREQ' denotes the output frequency.

The image output unit 530 may output a timing control signal TCS corresponding to the period (T) calculated based on the above-described Equation 3. Accordingly, the data driver 220 delays the image data signal DATA by the calculated period (T) based on the timing control signal TCS and outputs the delayed image data signal.

Referring to FIG. 4, the output frequency gradually changes according to the frequency determination algorithm including the above-described Equation 1 and Equation 2 in accordance with the variation of the input frequency. In such an embodiment, in Equation 1, SLOPE is 0.5 and OFFSET is 0.2. In one exemplary embodiment, for example, as illustrated in FIG. 4, when the input frequency changes from 144 Hz to 60 Hz, the output frequency gradually changes from 144 Hz to 60 Hz over a plurality of frames. In such an embodiment, as illustrated in FIG. 4, when the input frequency changes from 60 Hz to 90 Hz, the output frequency gradually changes from 60 Hz to 90 Hz over a plurality of frames. Accordingly, since the output frequency for driving the display panel 100 gradually changes, recognition of the flickering that may occur due to an abrupt change in the frequency for driving the display panel 100 may be effectively prevented or substantially minimized.

The DC-DC converter 400 generates voltages to be used for the display panel 100 by boosting or reducing a driving power VCC input through the system. In such an embodiment, the DC-DC converter 400 includes, for example, an output switching element for switching an output voltage of an output terminal of the DC-DC converter 400 and a pulse width modulator ("PWM") for increasing or decreasing the output voltage by controlling a duty ratio or a frequency of a control signal input to a control terminal of the output switching element. Herein, a pulse frequency modulator ("PFM") may be included in the DC-DC converter 400 instead of the PWM described above.

The PWM may increase the duty ratio of the aforementioned control signal to increase the output voltage of the DC-DC converter 400 or decrease the duty ratio of the control signal to lower the output voltage of the DC-DC converter 400. The PFM may increase the frequency of the aforementioned control signal to increase the output voltage of the DC-DC converter 400 or decrease the frequency of the control signal to lower the output voltage of the DC-DC converter 400. The output voltage of the DC-DC converter 400 may include a reference voltage VDD of about 6 volts (V) or more, a gamma reference voltage GMA of less than level 10, a common voltage Vcom in a range of about 2.5 V to about 3.3 V, a gate high voltage VGH of about 15 V or more and a gate low voltage VGL of about −4 V or less.

The gamma reference voltage GMA is a voltage generated by voltage division of the reference voltage. The reference voltage and the gamma reference voltage GMA, which are analog gamma voltages, are applied to the data driver 220. The common voltage Vcom is provided to the common electrode of the display panel 100 through the data driver 220. The gate high voltage VGH is a high logic voltage of the gate signal, which is set to be equal to or more than a threshold voltage of a switching element in a pixel. The gate low voltage VGL is a low logic voltage of the gate signal, which is set to be an off voltage of the switching element in the pixel. The gate high voltage VGH and the gate low voltage VGL are applied to the gate driver 210.

The gate driver 210 generates gate signals based on the gate control signal GCS provided from the timing controller 300 and sequentially applies the gate signals to the plurality of gate lines GL1 to GLi. The gate driver 210 may include, for example, a shift register that shifts the gate start pulse according to the gate shift clock to generate the gate signals. The shift register may include a plurality of driving switching elements. The driving switching elements may be formed in a non-display area of the display panel. The driving switching elements may be formed in a substantially same process as in the switching element of the pixel.

The data driver 220 receives the rearranged image data signals DATA' and the data control signal DCS from the timing controller 300. The data driver 220 samples the rearranged image data signals DATA' based on the data control signal DCS, latches the sampling data signals corresponding to one horizontal line in each horizontal period and applies the latched image data signals to the data lines DL1 to DLj. In one exemplary embodiment, for example, the data driver 220 converts the rearranged image data signals DATA' from the timing controller 300 into analog image data signals using the gamma reference voltages GMA input from the DC-DC converter 400 and applies the analog image data signals to the data lines DL1 to DLj.

Figure 5:
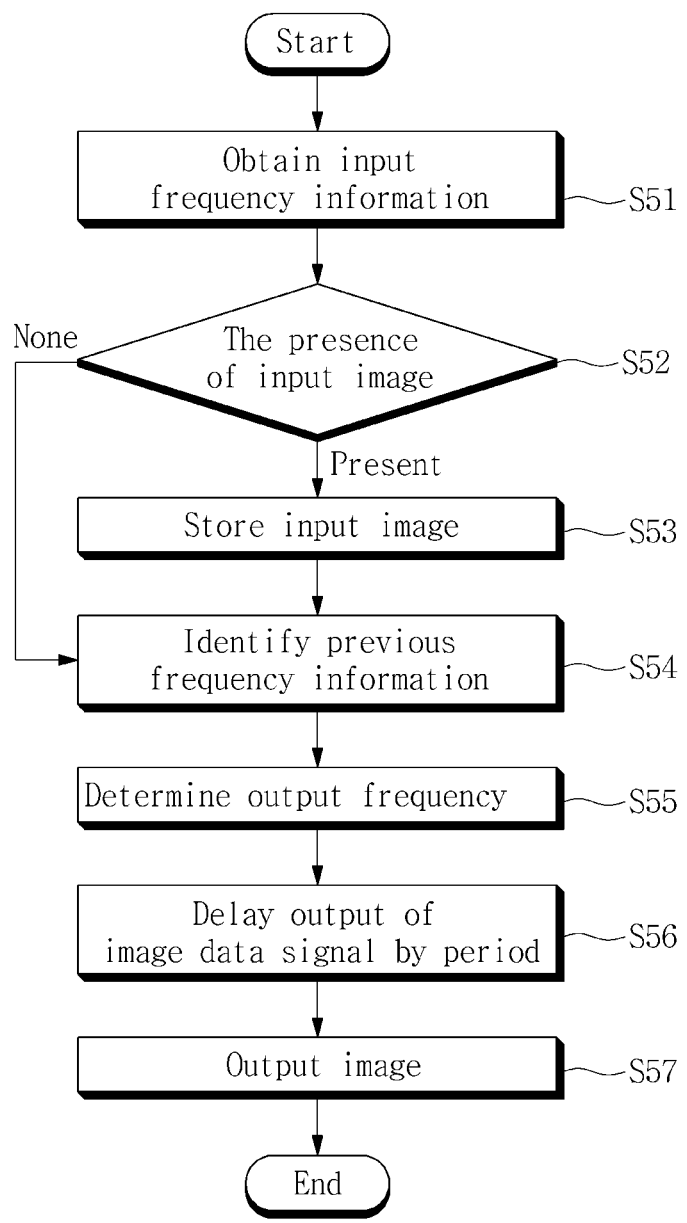
FIG. 5 is a flowchart illustrating a method of driving a display device according to an exemplary embodiment.
Figure 6A:
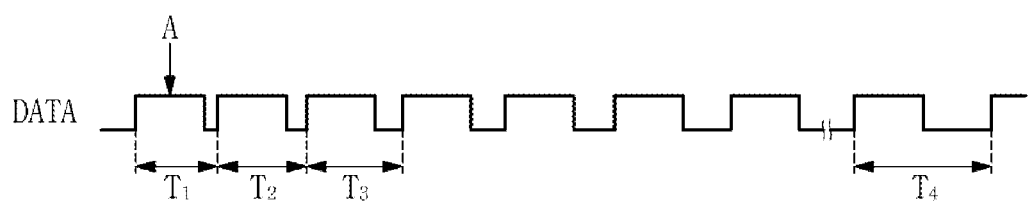
FIGS. 6A and 6B are timing diagrams illustrating frequency changes of a display device according to an exemplary embodiment.
Figure 6B:
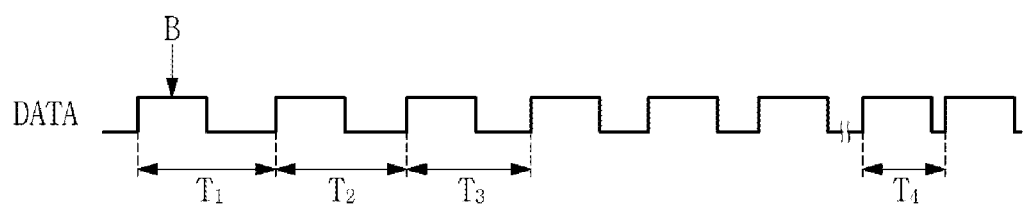

FIG. 5 is a flowchart illustrating a method of driving an LCD device according to an exemplary embodiment, and FIGS. 6A and 6B are timing diagrams illustrating frequency changes of an LCD device according to an exemplary embodiment. Hereinafter, a method of driving an LCD device according to an exemplary embodiment will be described with reference to FIGS. 5 and 6B.

Referring to FIG. 5, in an exemplary embodiment of a method of driving an LCD device, the input frequency information is obtained (s51). In an exemplary embodiment, the output frequency determining unit 520 obtains the input frequency information D_FREQ from an external device at the maximum frequency of the driving frequency of the display panel 100.

Subsequently, it is determined whether the image data signal DATA is input from the external device (S52). In an exemplary embodiment, the image processor 510 determines the presence or absence of the image data signal DATA input from the external device.

In such an embodiment, when it is determined in the process of S52 that there is an input image data signal DATA, the input image data signal DATA is stored in the frame memory 511 (S53). In an exemplary embodiment, when there is an input image data signal DATA, the input image data signal DATA is stored in the frame memory 511. Next, the previous output frequency (P_FREQ) stored in the output frequency determining unit 520 is identified (S54).

In such an embodiment, when it is determined in the process of S52 that there is no input image data signal DATA, the previous frequency information is identified (S54).

Next, the output frequency is determined based on the previous frequency and the input frequency (S55). In one exemplary embodiment, for example, the output frequency information D_FREQ' is determined using the frequency determination algorithm using the above-described Equation 1 and Equation 2.

Subsequently, the output of the image data signal DATA is delayed based on the output frequency information D_FREQ' (S56). In one exemplary embodiment, for example, the image output unit 530 calculates the period (T) corresponding to the output frequency information D_FREQ' using the output frequency information D_FREQ' and outputs the timing control signal TCS based on the period (T) to delay the output of the image data signal DATA by the calculated period (T).

Next, the image data signal DATA delayed by the period (T) according to the timing control signal TCS is output (S57).

According to an exemplary embodiment, in the case where the input frequency varies, the output frequency gradually varies by the frequency controller 500. In such an embodiment, the period of the image data signal DATA gradually varies in accordance with the output frequency. In such an embodiment, the period is inversely proportional to the output frequency.

Referring to FIG. 6A, in an exemplary embodiment, when the input frequency decreases at a certain point in time, periods $T_1$, $T_2$, $T_3$ and $T_4$ of the image data signal DATA gradually increase ($T_1 < T_2 < T_3 < T_4$). In such an embodiment, the output frequency of the image data signal DATA gradually decreases. In one exemplary embodiment, for example, at a point A in time, the input frequency may sharply drop from 120 Hz to 60 Hz. The output frequency gradually decreases by the frequency controller 500 and the periods $T_1$, $T_2$, $T_3$ and $T_4$ of the image data signal DATA gradually increase. In such an embodiment, the output frequency gradually approaches 60 Hz which is the input frequency, and the period of the image data signal DATA approaches a period corresponding to the input frequency. Accordingly, recognition of the flickering generated in the display panel driven at a frequency having an abrupt change may be effectively prevented or substantially minimized.

Since the output frequency gradually decreases by the frequency controller 500, the display panel 100 may be driven at a frequency higher than the input frequency. In such an embodiment, the image data signal DATA corresponding to the output frequency may not be input from an external device. In such an embodiment, the frequency controller 500 may output the image data signal DATA stored in the frame memory 511 from the image processor 510. In other words, even in the case where the image data signal DATA corresponding to the output frequency is not input from the external device, the stored image data signal DATA may be output. Accordingly, the method of driving the display device according to an exemplary embodiment may substantially minimize recognition of the flickering without degrading the display quality.

Referring to FIG. 6B, when the input frequency increases at a certain point in time, the periods $T_1$, $T_2$, $T_3$ and $T_4$ of the image data signal DATA gradually decrease ($T_1 > T_2 > T_3 > T_4$). In other words, the output frequency of the image data signal DATA gradually increases. In one exemplary embodiment, for example, at a point B in time, the input frequency may sharply increase from 60 Hz to 120 Hz. The output frequency gradually increases by the frequency controller 500 and the periods $T_1$, $T_2$, $T_3$ and $T_4$ of the image data signal DATA gradually decrease. In such an embodiment, the output frequency gradually approaches 120 Hz, which is the input frequency, and the period of the image data signal DATA approaches a period corresponding to the input frequency. Accordingly, recognition of the flickering generated in the display panel driven at a frequency having an abrupt change may be substantially minimized.

Figure 7:
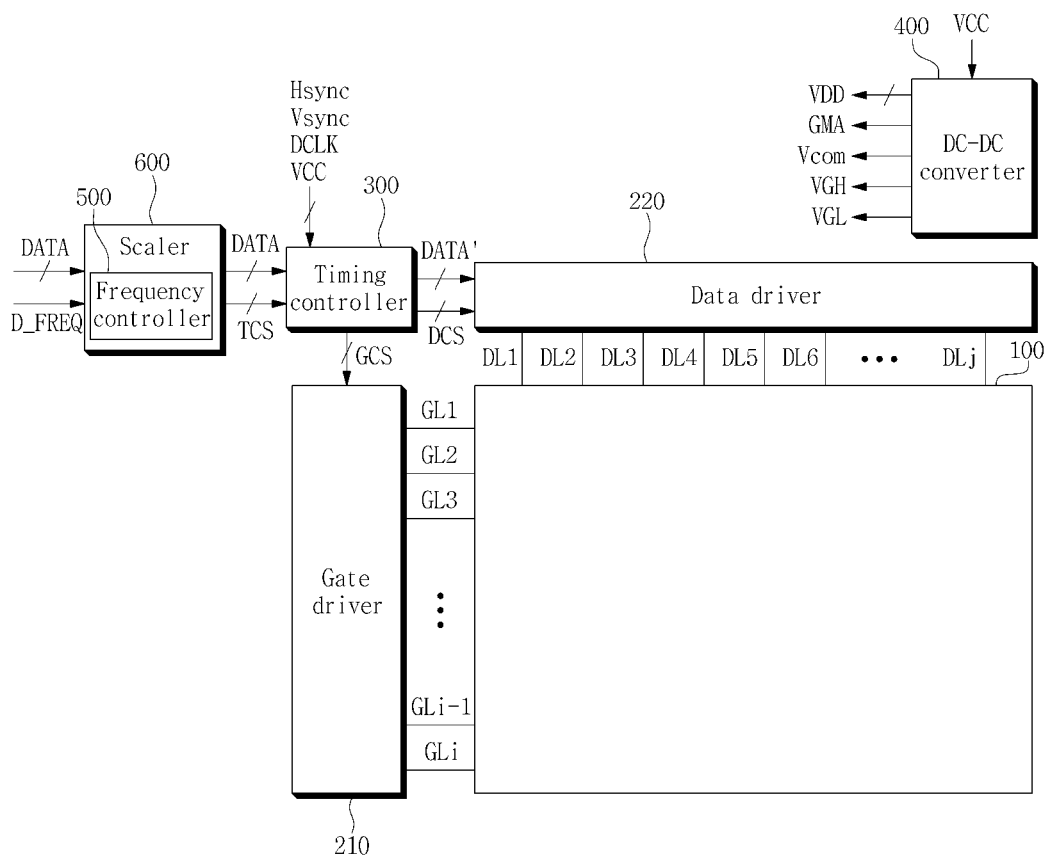
FIG. 7 is a block diagram illustrating a display device according to an alternative exemplary embodiment.

FIG. 7 is a block diagram illustrating a display device according to an alternative exemplary embodiment. Hereinafter, a display device according to an alternative exemplary embodiment will be described with reference to FIG. 7.

The block diagram in FIG. 7 is substantially the same as the block diagram shown in FIG. 1 except for a scaler 600. The same or like elements shown in FIG. 7 have been labeled with the same reference characters as used above to describe the exemplary embodiments of the display device shown in FIG. 1, and any repetitive detailed description thereof will hereinafter be omitted or simplified.

According to an alternative exemplary embodiment, the display device may include a scaler 600, and the scaler 600 may include a frequency controller 500.

The scaler 600 scales an image data signal DATA output from an external device according to a resolution set on the display panel 100. The scaler 600 may scale the image data signal DATA corresponding to a full resolution of the display panel 100 or may scale the image data signal DATA corresponding to a partial area of the display panel 100 such that an image may be displayed only on the partial area of the display panel 100.

As set forth hereinabove, according to one or more exemplary embodiments, the display device and the method of driving the display device may provide the following effects.

In such an embodiment, the recognition of flickering that may occur due to an abrupt change in frequency at which the display device is driven may be substantially minimized or effectively prevented by gradually changing the frequency for driving the display device.

While the invention has been illustrated and described with reference to the exemplary embodiments thereof, it will be apparent to those of ordinary skill in the art that various changes in form and detail may be formed thereto without departing from the spirit and scope of the invention.

What is claimed is:

1. A display device comprising:
   a display panel; and
   a frequency controller which receives an image data signal and an input frequency information and outputs the image data signal and a timing control signal, wherein the frequency controller comprises:
      an image processor which receives the image data signal;
      a frame memory which stores the image data signal;
      an output frequency determining unit which receives the input frequency information and determines an output frequency based on the input frequency information; and
      an image output unit which receives the image data signal from the image processor, receives an output frequency information on the output frequency from the output frequency determining unit, and outputs the image data signal and the timing control signal based on the output frequency information,
   wherein
   when an input frequency varies, the output frequency determining unit determines the output frequency based on a variation amount of the input frequency acording to Equation 1 and Equation 2,
   Equation 1 is defined by equation:

$$K = \left| \frac{FREQ - P\_FREQ}{M\_FREQ} \right| \times SLOPE + OFFSET,$$

Equation 2 is defined by equation:

$FREQ' = FREQ \times K + P\_FREQ \times (1-K)$, wherein
   K denotes a weight,
   FREQ denotes the input frequency,
   FREQ' denotes the output frequency,
   P_FREQ denotes a previous output frequency, which is previously stored in the output frequency determining unit,
   M_FREQ denotes a maximum frequency of driving frequencies of the display panel,
   SLOPE denotes a first variation rate constant, and
   OFFSET denotes a second variation rate constant.

2. The display device as claimed in claim 1, wherein each of SLOPE and OFFSET in Equation 1 is greater than zero and less than 1.

3. The display device as claimed in claim 2, wherein SLOPE in Equation 1 is 0.4 or greater and 0.6 or less, and OFFSET in Equation 1 is 0.1 or greater and 0.3 or less.

4. The display device as claimed in claim 2, wherein the output frequency determining unit further comprises a frequency storing unit.

5. The display device as claimed in claim 1, wherein M_FREQ in Equation 1 is 144 hertz.

6. The display device as claimed in claim 1, further comprising:
   a timing controller comprising the frequency controller.

7. The display device as claimed in claim 1, further comprising:
   a scaler comprising the frequency controller.

8. The display device as claimed in claim 1, wherein when the input frequency varies, the output frequency information gradually approaches the input frequency information.

9. The display device as claimed in claim 1, wherein the image output unit calculates a period of the image data signal according to Equation 3,
   wherein Equation 3 is defined by equation:

$$T = \frac{1}{FREQ'},$$

wherein T denotes the period.

10. A method of driving a display device, the method comprising:
obtaining an input frequency information;
determining whether an image data signal is input;
storing the image data signal;
identifying a previous frequency information;
calculating and determining an output frequency;
calculating a period based on the output frequency and delaying an output of the image data signal by the period; and
outputting the image data signal,
wherein the calculating and determining the output frequency comprises:
calculating the output frequency according to Equation 1 and Equation 2,
wherein
Equation 1 is defined by equation:

$$K = \left| \frac{FREQ - P\_FREQ}{M\_FREQ} \right| \times SLOPE + OFFSET,$$

Equation 2 is defined by equation:

$FREQ' = FREQ \times K + P\_FREQ \times (1-K),$ wherein
K denotes a weight,
FREQ denotes an input frequency,
FREQ' denotes the output frequency,
P_FREQ denotes a previous output frequency, which is previously stored,
M_FREQ denotes maximum frequency of driving frequencies of a display panel of the display device,
SLOPE denotes a first variation rate constant, and
OFFSET denotes a second variation rate constant.

11. The method as claimed in claim 10, wherein the calculating the period and the delaying the output of the image data signal by the period comprises:
calculating the period according to Equation 3;
outputting a timing control signal for delaying the output of the image data signal by the period; and
delaying the output of the image data signal based on the timing control signal,
wherein Equation 3 is defined by equation:

$$T = \frac{1}{FREQ'},$$

wherein T denotes the period.

12. The method as claimed in claim 10, wherein the storing the image data signal comprises:
storing the image data signal when it is determined that the image data signal is input, and
not storing the image data signal when it is determined that the image data signal is not input.

13. The method as claimed in claim 12, wherein the outputting the image data signal comprises:
outputting an stored image data signal when it is determined that the image data signal is not input.

* * * * *